(12) United States Patent
Biggerstaff (10) Patent No.: US 9,743,586 B2
(45) Date of Patent: Aug. 29, 2017

(54) MOUNTING ARRANGEMENT FOR A STRAW CHOPPER AND CHAFF SPREADER IN A COMBINE HARVESTER RESIDUE MANAGEMENT SYSTEM

(71) Applicant: AGCO Corporation, Hesston, KS (US)

(72) Inventor: Joseph Mark Biggerstaff, Wichita, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 15/289,368

(22) Filed: Oct. 10, 2016

(65) Prior Publication Data
US 2017/0079208 A1 Mar. 23, 2017

Related U.S. Application Data

(63) Continuation-in-part of application No. 14/857,214, filed on Sep. 17, 2015, now Pat. No. 9,497,903.

(51) Int. Cl.
*A01F 12/40* (2006.01)
*A01D 41/12* (2006.01)

(52) U.S. Cl.
CPC .......... *A01D 41/1243* (2013.01); *A01F 12/40* (2013.01)

(58) Field of Classification Search
CPC ........ A01F 12/40; A01F 29/12; A01F 29/095; A01D 41/1243
See application file for complete search history.

(56) References Cited

U.S. PATENT DOCUMENTS

| | | | | |
|---|---|---|---|---|
| 4,669,489 A * | 6/1987 | Schraeder | ............... | A01F 12/40 241/186.3 |
| 5,797,793 A * | 8/1998 | Matousek | .......... | A01D 41/1243 460/111 |
| 5,833,533 A * | 11/1998 | Roberg | ................... | A01F 12/40 460/112 |
| 5,944,604 A * | 8/1999 | Niermann | ............... | A01F 12/40 460/112 |
| 6,251,009 B1 * | 6/2001 | Grywacheski | .......... | A01F 12/40 460/112 |
| 6,416,405 B1 * | 7/2002 | Niermann | ............... | A01F 12/40 241/186.3 |
| 6,547,169 B1 * | 4/2003 | Matousek | ............... | A01F 12/40 239/149 |
| 6,656,038 B1 * | 12/2003 | Persson | ................... | A01F 12/40 460/112 |
| 7,066,810 B2 * | 6/2006 | Farley | ................ | A01D 41/1243 460/112 |
| 7,648,413 B2 * | 1/2010 | Duquesne | ............ | A01D 41/127 460/112 |
| 7,717,779 B1 * | 5/2010 | Weichholdt | ........ | A01D 41/1243 460/112 |
| 8,029,347 B2 * | 10/2011 | Pohlmann | .......... | A01D 41/1243 460/112 |

(Continued)

*Primary Examiner* — Árpád Fábián-Kovács (57) ABSTRACT

A combine harvester includes a residue management system having a chaff spreader mounted to a straw chopper. The chaff spreader is positioned in front of the straw chopper and is configured to collect and spread chaff from a cleaning shoe when in a spreading position. A mechanical linkage is provided between the straw chopper and chaff spreader so that movement of the straw chopper from an operating position to a non-operating position is translated into pivoting of the chaff spreader from a spreading position to a non-spreading position.

12 Claims, 4 Drawing Sheets

(56) References Cited

U.S. PATENT DOCUMENTS

| | | | |
|---|---|---|---|
| 8,585,475 B2* | 11/2013 | Isaac | A01F 12/40 460/111 |
| 9,497,903 B2* | 11/2016 | Biggerstaff | A01D 41/1243 |
| 2003/0109294 A1* | 6/2003 | Wolters | A01F 12/40 460/112 |
| 2003/0114207 A1* | 6/2003 | Wolters | A01F 12/40 460/111 |
| 2004/0029624 A1* | 2/2004 | Weichholdt | A01F 12/40 460/112 |
| 2004/0092298 A1* | 5/2004 | Holmen | A01D 41/1243 460/111 |
| 2004/0137974 A1* | 7/2004 | Weichholdt | A01F 12/40 460/112 |
| 2004/0176150 A1* | 9/2004 | Gryspeerdt | A01F 12/40 460/112 |
| 2004/0176151 A1* | 9/2004 | Gryspeerdt | A01F 12/40 460/112 |
| 2004/0242291 A1* | 12/2004 | Weichholdt | A01D 41/1243 460/112 |
| 2005/0124399 A1* | 6/2005 | Holmen | A01D 41/1243 460/111 |
| 2005/0124400 A1* | 6/2005 | Schmidt | A01D 41/1243 460/111 |
| 2005/0282602 A1* | 12/2005 | Redekop | A01F 12/40 460/112 |
| 2006/0246965 A1* | 11/2006 | Lauer | A01F 12/40 460/111 |
| 2007/0066370 A1* | 3/2007 | Redekop | A01D 41/1243 460/112 |
| 2008/0234019 A1* | 9/2008 | Teroerde | A01F 12/444 460/100 |
| 2008/0305842 A1* | 12/2008 | Benes | A01F 12/40 460/112 |
| 2009/0042625 A1* | 2/2009 | Dow | A01D 41/1243 460/112 |
| 2009/0156277 A1* | 6/2009 | Benes | A01D 41/1243 460/112 |
| 2009/0325659 A1* | 12/2009 | Overschelde | A01D 41/1243 460/112 |
| 2010/0120482 A1* | 5/2010 | Holmen | A01D 41/1243 460/112 |
| 2010/0184494 A1* | 7/2010 | Klein | A01D 41/1243 460/112 |
| 2011/0045883 A1* | 2/2011 | Weichholdt | A01D 41/1243 460/112 |
| 2011/0053668 A1* | 3/2011 | Weichholdt | A01D 41/1243 460/112 |
| 2011/0053669 A1* | 3/2011 | Weichholdt | A01D 41/1243 460/112 |
| 2014/0364179 A1* | 12/2014 | Brinkmann | A01D 41/1243 460/112 |
| 2015/0351322 A1* | 12/2015 | Desmet | A01D 41/1243 460/114 |
| 2016/0088794 A1* | 3/2016 | Baumgarten | A01D 41/127 460/1 |

* cited by examiner

MOUNTING ARRANGEMENT FOR A STRAW CHOPPER AND CHAFF SPREADER IN A COMBINE HARVESTER RESIDUE MANAGEMENT SYSTEM

CROSS-REFERENCE TO RELATED APPLICATION

The present application is a continuation-in-part of and claims the benefit of U.S. patent application Ser. No. 14/857,214, filed Sep. 17, 2015, and claims priority to and the benefit of U.S. application No. 62/064,792, filed Oct. 16, 2014, each herein incorporated by reference in its entirety.

BACKGROUND OF THE INVENTION

Field of Invention

The invention relates to combine harvester residue management systems which include a straw chopper for chopping crop residue from separating apparatus and a chaff spreader, located in front of the straw chopper, for distributing chaff ejected from the rear of a cleaning shoe, both of which being located towards the rear of the harvester.

Description of Related Art

It is well known to provide straw chopping apparatus at the rear of combine harvesters to chop and spread crop residue, hereinafter referenced 'straw', ejected from the rear of separating apparatus. To cater for the different requirements of farmers, chopping and non-chopping configurations are typically provided. This allows the operator to select whether or not the straw is chopped and spread or conveyed directly onto the ground in a windrow for subsequent baling.

In some known systems a diverter (or baffle) plate is provided which directs the ejected straw either into the chopper or, in a different position, onto the ground. Alternatively, the chopper can be moved in to and out of a chopping position below the separating apparatus. In one example of such U.S. Pat. No. 4,669,489 discloses a straw chopper which is slideably supported on a pair of spaced apart longitudinally oriented guide rails so that the chopper can be adjusted from a rearward operating position to a forward inoperative or windrow position. In a second example, U.S. Pat. No. 6,251,009 discloses a chopper having a housing which rotates from a chopping position into a rearwardly raised windrowing position.

A further benefit of providing a straw chopper which moves from one position to another is the increased convenience for maintenance and operator-access to the rear end of the separating apparatus and cleaning shoe.

It is also well known to install chaff spreaders behind the cleaning shoe for collecting and distributing the chaff ejected from the rear thereof. Typically the chaff spreader includes a pair of fan modules which eject the chaff at a tangent to the fan axis. Such a chaff spreader is disclosed in U.S. Pat. No. 6,656,038 for example, the contents of which are incorporated herein by reference.

It is known to mount the chaff spreading apparatus in a manner which permits movement of the chaff spreader from an operating position to a non-operating position, wherein the latter permits access for the operator to the rear of the cleaning shoe for cleaning or sieve replacement for example.

SUMMARY OF INVENTION

In accordance with one aspect of the invention there is provided a combine harvester comprising a frame, a residue management system mounted to the frame in a rear region of the combine harvester, wherein the rear region includes a cleaning shoe ejection zone and a straw ejection zone, wherein the residue management system comprises a straw chopper mounted to the frame in the vicinity of the straw ejection zone, and a chaff spreader supported by the straw chopper and being movable between a spreading position and a non-spreading position, wherein, in the spreading position, the chaff spreader is configured to collect chaff ejected by a cleaning shoe, wherein the straw chopper is movable between an operating position and a non-operating position, and wherein the straw chopper is positioned behind the chaff spreader.

By mounting the chaff spreader to the straw chopper, design freedom is improved around the traditionally congested area around the rear axle.

In a first embodiment of the invention the chaff spreader is slideably mounted to the straw chopper by a pair of longitudinally extending, transversely spaced, telescopic members, wherein the chaff spreader is moveable fore and aft with respect to the straw chopper. The telescopic members may simply comprise sets of tubes that slide inside one another.

The residue management system may be configured to permit the chaff spreader to be positioned in the spreading position when the straw chopper is in the non-operating position, in which configuration the straw chopper is disposed behind the straw ejection zone, and the chaff spreader is disposed in front of the straw ejection zone. In such an arrangement, straw ejected from the straw ejection zone falls between the chaff spreader and the straw chopper in a windrowing mode.

In a second embodiment of the invention the chaff spreader is pivotally mounted to the straw chopper so as to be pivotable about a transverse pivot axis between the spreading position and the non-spreading position. The residue management system may further comprise a mechanical linkage connecting the chaff spreader and the straw chopper, wherein movement of the straw chopper from the operating position to the non-operating position is translated into pivoting of the chaff spreader from the spreading position to the non-spreading position.

In accordance with a second aspect of the invention there is provided a combine harvester comprising a residue management system having a straw chopper mounted in the vicinity of a straw ejection zone, and a chaff spreader pivotally mounted to the straw chopper proximate to a cleaning shoe ejection zone, the chaff spreader being pivotable about a transverse pivot axis between a spreading position and a non-spreading position, the straw chopper being moveable between an operating position and a non-operating position, and a mechanical linkage connecting the chaff spreader and straw chopper, wherein movement of the straw chopper from the operating position to the non-operating position is translated into pivoting of the chaff spreader from the spreading position to the non-spreading position.

By mechanically coupling the movement freedom of the straw chopper and chaff spreader, access to the rear end of the processing apparatus is gained more conveniently. In use, the operator need simply move one of the straw chopper or chaff spreader into a non-operative position wherein such action causes simultaneous movement of the other unit.

The chaff spreader may comprise at least one, typically two, fan modules mounted to an arm or frame which is pivotally connected to a frame member of the harvester, the fan module comprising a rotating impellor within a housing, the housing having an inlet for receiving chaff ejected by the cleaning shoe and an outlet for ejecting the received chaff.

In a preferred arrangement, the straw chopper is mounted to a frame member of the combine harvester by a sliding mechanism which permits linear movement of the straw chopper in a generally fore and aft direction between the operating position and non-operating position. Preferably further still, the slideable straw chopper can be positioned in a forward operating position or a rearward non-operating position. However, it is envisaged that the straw chopper may instead slide forward into the non-operating position depending on the architecture of the combine harvester upon which it is installed.

To facilitate such fore and aft sliding, a pair of longitudinally extending transversely spaced rails may be mounted inside a downwardly facing ejection outlet provided by a rear discharge hood which may be formed from the shielding of the combine harvester.

The mechanical linkage preferably comprises a crank arm associated with the chaff spreader and a connecting rod connected between the crank arm and straw spreader. Such an arrangement is simple in construction with few parts to fail. Furthermore, the crank arm and connecting rod can be simply disconnected by operator when required, for example when only the chaff spreader is required in a non-operating position.

The residue management system preferably comprises an actuator such as a hydraulic cylinder or electric motor configured to control movement of the straw chopper between the operating position and the non-operating position. It should be appreciated that the actuator could instead be connected to the chaff spreader wherein the linkage serves to shift the other component in tandem.

BRIEF DESCRIPTION OF DRAWINGS

Further advantages of the invention will become apparent from reading the following description of a specific embodiment with reference to the appended drawings in which.

DETAILED DESCRIPTION OF SPECIFIC EMBODIMENTS

It should be understood that following use of relative terms such as forward, rearward, transverse and longitudinal will be made with reference to the normal forward direction of the combine harvester described.

Figure 1:
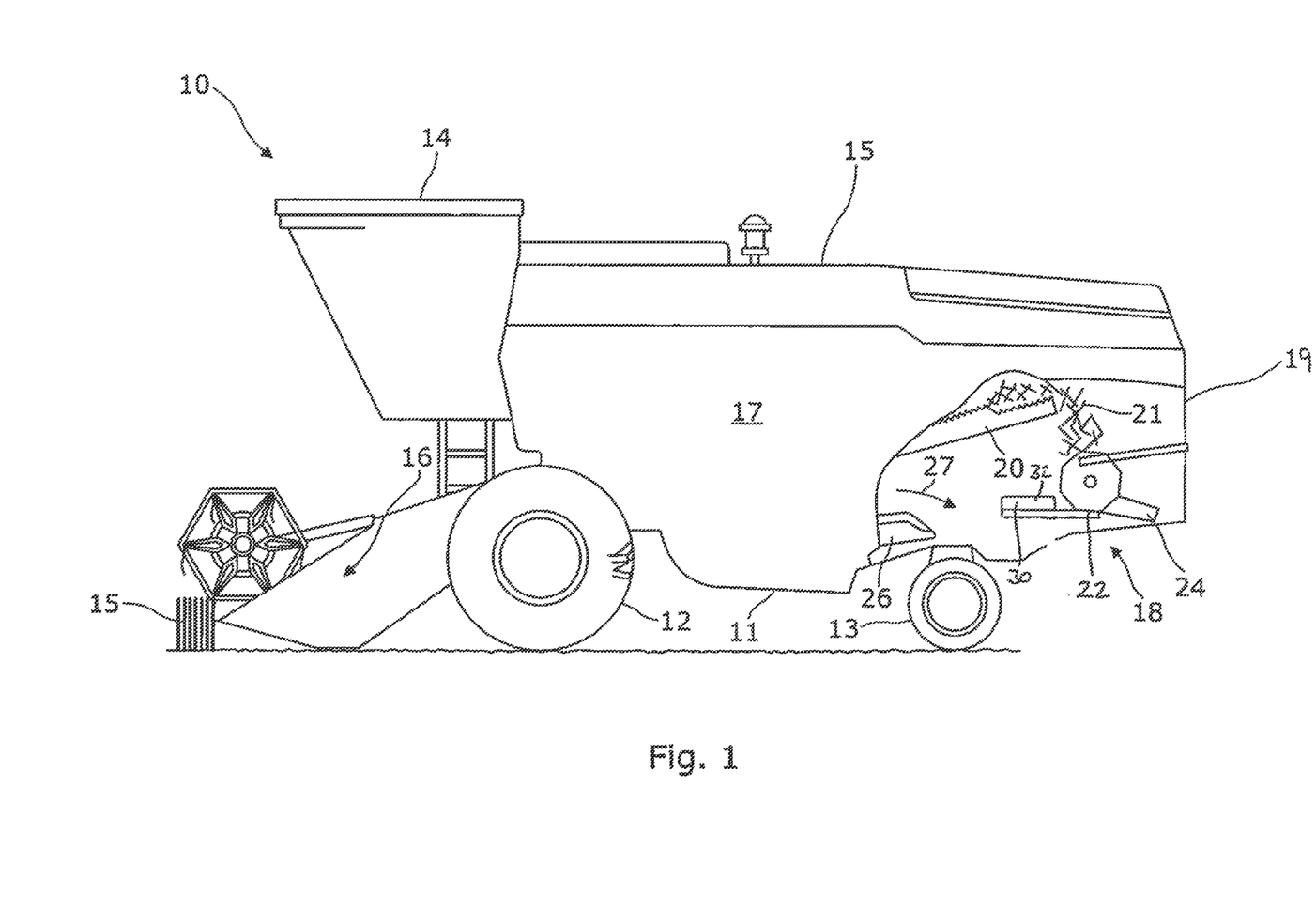
FIG. 1 is a schematic side representation of a combine harvester in accordance with the invention with part of the rear shielding cut away to reveal a residue management system.

With reference to FIG. 1, a combine harvester 10 comprises a chassis 11, front wheels 12, rear steerable wheels 13, and a driver's cab 14. Driven across a field of standing crop a cutting head 16 cuts and gathers the crop material 15 which is then conveyed into the main body 17 of the combine which includes threshing apparatus, separating apparatus, a grain cleaning shoe and a storage tank, as per conventional harvesters. Shielding 19 at the rear of the machine is partially cut away in the figures to reveal the residue management system which is designated generally at 18.

Part of the separating system is shown in the form of straw walkers 20 which serve to separate grain from the remainder of the crop material, hereinafter termed "straw". As shown at 21 straw falls from the rear edge of the straw walkers 20, in a straw ejection zone, either into a straw chopper (as per the FIGS. 1, 2, 5 and 6 configurations) or directly onto the ground in a windrow (as per the FIGS. 3, 4 and 7 configurations). It should be understood that the type of separating system is not limited to conventional straw walkers but may instead comprise one or more axial rotors for example.

The straw chopper 22 in this embodiment has secured thereto a spreader 24 for spreading the chopped straw material. The operation of the spreader 24 is not relevant to describing the current invention and so further description will not be given.

The cleaning shoe is conventional in construction and comprises, inter alia, a series of sieves and a blower unit (not shown). The rear part of the cleaning shoe is shown in the form of part of a chaffer 26 which serves to clean the grain incident thereon whilst ejecting the chaff (or grain husks) from the rear of the shoe, in a cleaning shoe ejection zone as indicated at 27, by means of an air flow generated by the blower unit.

A chaff spreader 30 is provided behind the chaffer 26 and includes a pair of fan modules 32 mounted to the chopper 22 by means of one of several alternative mechanisms (to be described below), in front of the chopper 22. It should be understood that the pair of fan modules are arranged side-by-side and that only the side of one fan module 32 is visible in the figures.

Figure 2:
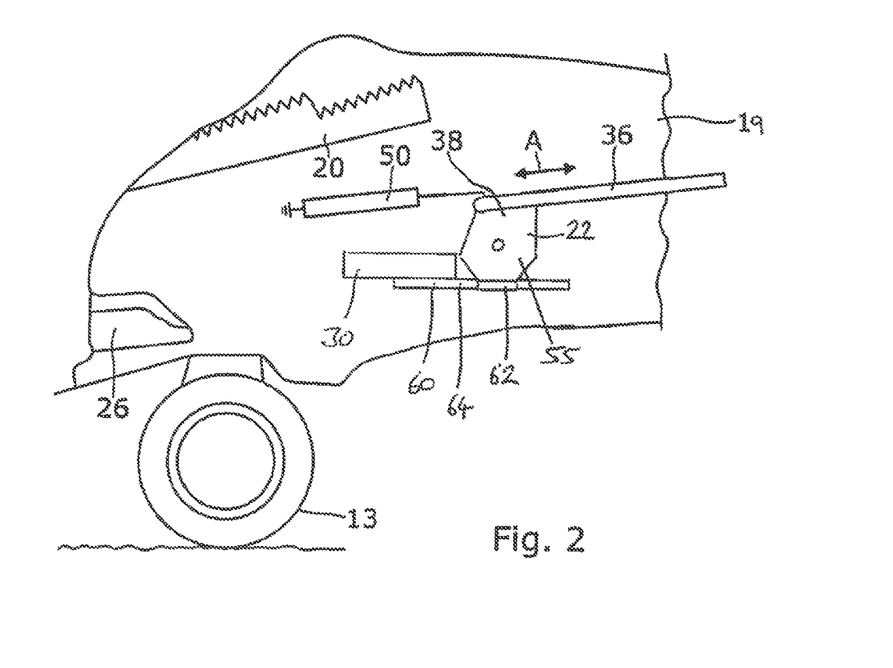
FIG. 2 is an enlarged view of the residue management system in accordance with a first embodiment of the invention showing the straw chopper and chaff spreader in an operating position.
Figure 3:
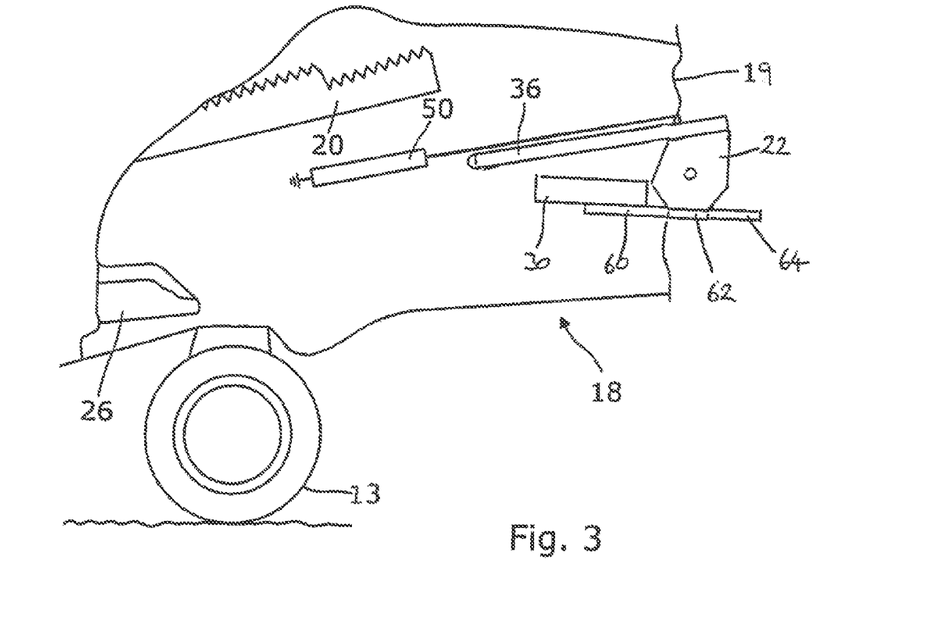
FIG. 3 shows the residue management system of FIG. 2 with the straw chopper shown in the non-operating position and the chaff spreader in a non-spreading position.
Figure 4:
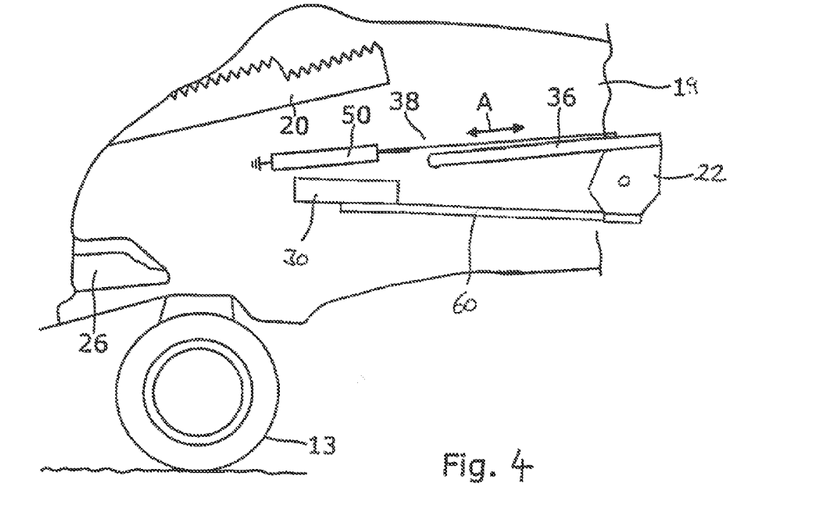
FIG. 4 shows the residue management system of FIG. 2 with the straw chopper in the non-operating position and the chaff spreader in a spreading position.

A first embodiment of the invention is shown in FIGS. 2, 3 and 4. Straw chopper 22 is mounted to the shielding 16 (or combine frame in general) by a pair of longitudinally extending transversely spaced rails 36. The precise manner in which the straw chopper 22 is mounted to the rails 36 is not critical to the understanding of the invention but, by way of example, the mechanism may be of a similar form to that described in U.S. Pat. No. 4,669,489 the contents of which are incorporated herein by reference. The chopper 22 is slideable in a generally fore and aft direction upon the rails 36 between an operating position shown in FIG. 2 and a non-operating position shown in FIGS. 3 and 4. The direction of movement of the chopper 22 is indicated by arrow A in FIG. 2.

In the operating position shown in FIG. 2 straw 21 ejected from the straw walkers 20 falls under gravity into an inlet provided in the top side 38 of chopper 22. In the non-operating position shown in FIGS. 3 and 4 the straw 21 simply falls to the ground forming a windrow behind the combine.

The straw chopper 22 comprises a chopper housing or weldment 55, the housing enclosing a chopping rotor fitted with knives (not shown).

In a not-illustrated alternative arrangement the chopper 22 remains stationary when changing between chopping and non-chopping modes, and instead an upstream diverter plate is provided to direct the falling straw either into the chopper or past the chopper onto the ground. In such an arrangement, the chopper 22 may still be shiftable in a fore and aft direction into a non-operating position for maintenance or for access to the inner workings of the combine. It should also be understood that, with a different layout, the operating position of the chopper 22 may be rearward of the non-operating position.

An actuator, here shown as a hydraulic cylinder 50, may be provided to automate movement of the chopper 22 and chaff spreader 30 (without manual intervention of the operator). In the embodiment shown, the hydraulic cylinder 50 is connected between the combine frame 11 and straw chopper 22. Operation of the cylinder 50 causes the chopper 22 to move in a fore and aft direction.

It should be understood that alternative forms of actuator may be employed instead such as electric motors, pneumatic cylinders or chain-and-sprocket drives. It should also be understood that any actuator may be connected at various different locations on the residue management system 18.

Turning back to the embodiment of FIGS. 2, 3 and 4, the chaff spreader 30 is slideably mounted to the straw chopper 22, to the front side thereof, by a pair of longitudinally extending, transversely spaced, telescopic members 60 which permit the chaff spreader 30 to move fore and aft with respect to the chopper 22. Each telescopic member 60 comprises a rigid outer tube 62 secured to the underside of the chopper weldment 55 and a rigid inner tube 64 secured to the chaff spreader 30. The telescopic members 60 are aligned longitudinally so as to extend fore and aft. As can be seen from FIGS. 2 and 3, the inner tube 64 may pass through the front and rear ends of the outer tube 62. It should be appreciated that the telescopic members 60 may be constructed and secured to the chopper 22 and chaff spreader 30 differently to that described whilst remaining within the scope of the invention.

The telescopic members 60 may be manually operated or controlled by a hydraulic or electric actuator from the cab. A lock-out mechanism may be provided to secure the position of the chaff spreader 30 relative to the straw chopper 22, such as a simple pin (not shown).

Sensors may be provided in association with the position of the straw chopper 22 in relation to the chassis 11, and/or in association with the position of the chaff spreader 30 in relation to the straw chopper 22. Signals from the sensors may be used by an electronic controller for the associated actuators, including cylinder 50. For example, forward movement of the straw chopper 22 may be prevented if the telescopic members 60 are in an extended state so as to avoid interference between the chaff spreader 30 and the rear of the combine frame.

In a first configuration shown in FIG. 2, the straw chopper 22 is positioned forwardly in an operating position wherein straw ejected by the straw walkers 20 passes through a straw ejection zone and into the chopper 22. The chaff spreader 30 is positioned in front of the chopper 22 with the telescopic members 60 in a retracted state so that the chaff spreader 30 is configured to collect chaff ejected by the cleaning shoe 26.

In a second configuration shown in FIG. 3, the straw chopper 22 is positioned rearwardly in a non-operating position for servicing or to allow the straw to fall directly onto the ground in a windrow. The telescopic members 60 remain in the retracted state so that the chaff spreader 30 is also positioned in a non-operating or non-spreading position in front of the chopper 22 but behind the straw ejection zone.

In a third configuration shown in FIG. 4, the straw chopper 22 is positioned rearwardly in the non-operating position to allow the straw to fall directly onto the ground in a windrow. However, the telescopic members 60 are extended so as to position the chaff spreader 30 in the spreading position, in front of the straw ejection zone. In this configuration the ejected straw passes between the chaff spreader 30 and the straw chopper 22 onto the ground. Moreover, the ejected straw passes between the extended telescopic member 60. Advantageously, the configuration permits the chaff from the cleaning shoe 26 to be spread whilst the ejected straw is windrowed.

In summary, the first embodiment of FIGS. 2-4 comprises a chaff spreader 30 supported on the main weldment of a straw chopper 22 by a pair of telescopic members 60 which permit longitudinal translational movement of the chaff spreader 30 with respect to the straw chopper 22.

Figure 5:
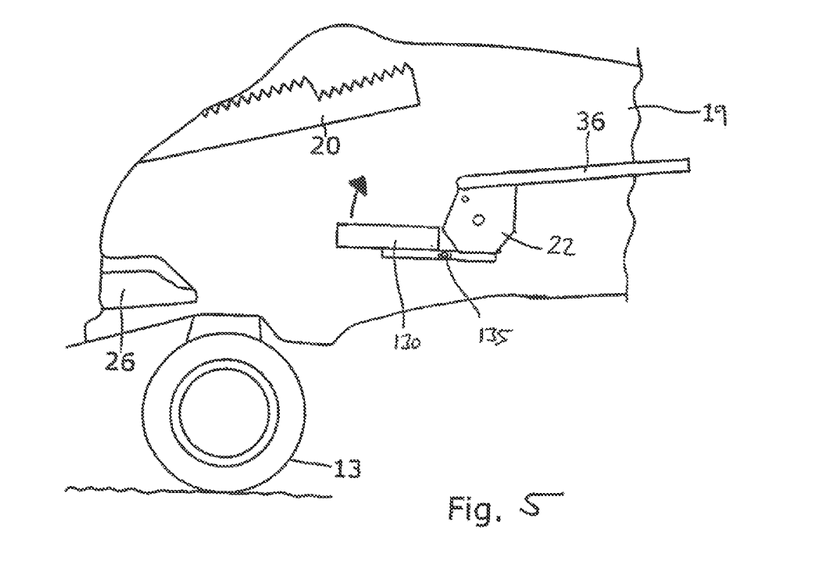
FIG. 5 is an enlarged view of the residue management system in accordance with a second embodiment of the invention showing the straw chopper and chaff spreader in an operating position.

A second embodiment will now be described with reference to FIGS. 5, 6 and 7. Straw chopper 22 is again mounted to the combine frame 11 by a pair of longitudinally extending transversely spaced rails 36 which permit fore and aft movement of the straw chopper. Although not shown an actuator may be provided to control and/or automate fore and aft movement of the chopper 22.

Figure 6:
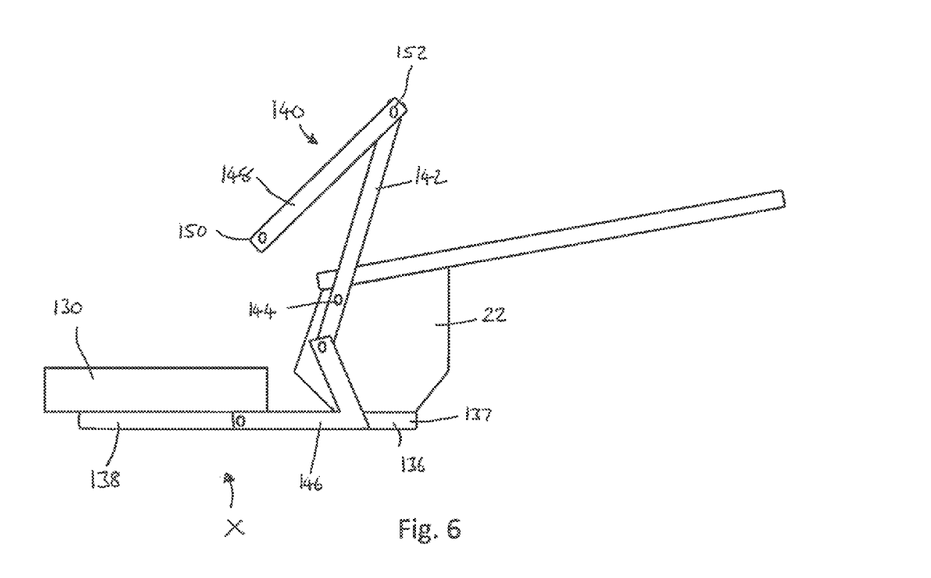
FIG. 6 shows an enlarged simplified view of the residue management system of FIG. 5 illustrating a linkage when the straw chopper and the chaff spreader are in the operating positions.
Figure 7:
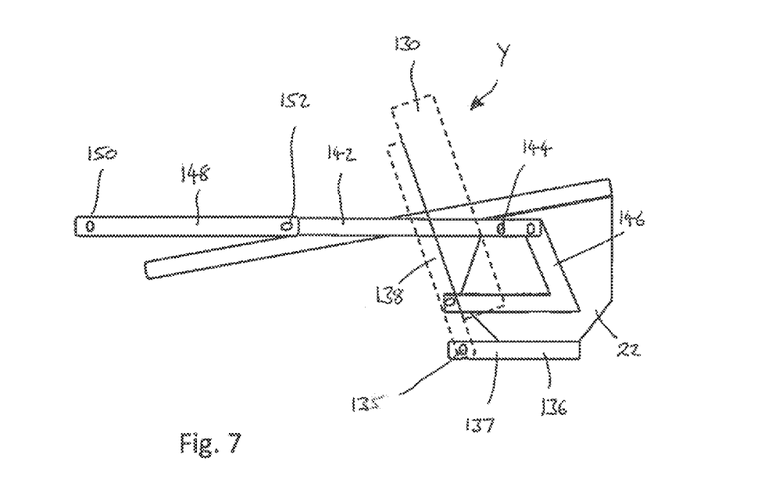
FIG. 7 shows an enlarged simplified view of the residue management system of FIG. 5 illustrating the linkage when the straw chopper is in the non-operating position and the chaff spreader is in a non-spreading position.

In this embodiment the chaff spreader 130 is pivotally mounted to the straw chopper 22 so as to be pivotable around a transverse axis 135 from a spreading, or operating, position X shown in FIG. 6 upwardly (or downwardly) into a non-spreading or non-operating position Y shown in FIG. 7. In the operating position X the husk or chaff are blown in to the chaff spreader 130 and spread sideways across the working width of the header 16. In an alternative configuration not shown in the drawings, means are provided to direct the chaff into the chopper 22 for subsequent distribution.

In the non-operating position Y of FIG. 7, in operation the chaff passes direct on to the ground. However, this also provides a maintenance position wherein the operator can easily access the rear of the cleaning shoe 26 or straw walkers 20 to deal with blockage or general maintenance.

The chaff spreader 130 is mounted to the straw chopper 22 by a pair of laterally-spaced pivoting linkages 136 which each include a first arm 137 secured to the underside of straw chopper weldment 55 and a second arm 138 secured to the underside of chaff spreader 130. The arms 137, 138 pivot around transverse pivot axis 135 by a suitable joint. The linkages 136 are configured to move only between an angular range defining the lowered spreading position and the raised non-spreading position.

In accordance with an aspect of invention, a mechanical linkage designated generally at 140 connects the chaff spreader 130 with the straw chopper 22 so as to couple together their respective movements. The linkage 140 is omitted from FIG. 5 for clarity.

Linkage 140 comprises a lever 142 which is pivotally mounted on the side of straw chopper 22 so as to define the lever's fulcrum 144 around which the lever 142 pivots. A link arm 146 connects one end of the lever 142 to the chaff spreader 130 or the arm 138 secured to the underside thereof. The link arm 146 serves to translate pivoting movement of the lever 142 into pivoting movement of the chaff spreader 130 around pivot axis 135. Although shown as being L-shaped, the link arm 146 may be shaped differently whilst still delivering comparable functionality.

A tie link 148 is pivotally connected at one end 150 to a fixed point on the chassis 11, and at the other end 152 to the end of the lever 142 opposite the link arm 146.

The linkage 140 may reside inside the shielding 16 or outside. Furthermore, the linkage 140 may be mirrored on each side of the residue management system.

The linkage 140 serves to pivot the chaff spreader 130 upwardly from a spreading position (FIG. 6) into a non-spreading position (FIG. 7) as the straw chopper 22 is slid rearwardly from the operating position into the non-operating position. In other words, the linear movement of the straw chopper 22 is translated into pivoting movement of the attached chaff spreader 130.

The chaff spreader 130 is shown in dashed form in FIG. 7 in the non-spreading position Y and it should be understood that the housing of straw spreader 22 and surrounding elements of the residue management system are configured to permit the chaff spreader 130 to fold upwardly as required.

Conveniently, the arrangement of the second embodiment automatically moves the chaff spreader 130 into the non-spreading position as the straw chopper 22 is moved rearwardly. Being mounted to the straw chopper 22, the chaff spreader 130 is therefore moved clear of the cleaning shoe thus allowing easier servicing thereof.

Although described with linkage 140, it should be appreciated that the linkage could alternatively be omitted wherein the chaff spreader 130 is pivoted with respect to the straw chopper 22 by other means, such as a dedicated actuator or even manually.

Although the disclosed systems have been described with reference to the example embodiments illustrated in the attached drawing figures, it is noted that equivalents may be employed and substitutions made herein without departing from the scope of the disclosure as protected by the following claims.

The invention claimed is:

1. A combine harvester comprising:
a frame;
a residue management system mounted to the frame in a rear region of the combine harvester, wherein the rear region includes a cleaning shoe ejection zone and a straw ejection zone; wherein the residue management system comprises:
a straw chopper mounted to the frame in the vicinity of the straw ejection zone, and a chaff spreader supported by the straw chopper, wherein in a spreading position, the chaff spreader is configured to collect chaff ejected by a cleaning shoe and is positioned in front of the straw chopper with respect to a normal forward direction of the combine harvester;
wherein the straw chopper comprises an inlet and said chopper is configured to be movable to either an operating position in which straw falls into the inlet from the straw ejection zone, or a non-operating position in which straw ejected from the straw ejection zone bypasses the inlet.

2. The combine harvester according to claim 1, wherein the chaff spreader is mounted to the straw chopper by a pair of longitudinally extending, transversely spaced, telescopic members, and wherein the chaff spreader is moveable between a fore position and an aft position with respect to the straw chopper by the telescopic members.

3. The combine harvester according to claim 2, wherein each telescopic member comprises an outer tube secured to the straw chopper and an inner tube secured to the chaff spreader and being received in the outer tube.

4. The combine harvester according to claim 2, further comprising an actuator mounted between the straw chopper and the chaff spreader, the actuator being configured to control the fore and aft movement of the chaff spreader with respect to the straw chopper.

5. The combine harvester according to claim 2, wherein the residue management system is configured to permit the chaff spreader to be positioned in the spreading position when the straw chopper is in the non-operating position, in which configuration the straw chopper is disposed behind the straw ejection zone, and the chaff spreader is disposed in front of the straw ejection zone.

6. The combine harvester according to claim 1, wherein the chaff spreader is pivotally mounted to the straw chopper so as to be pivotable about a transverse pivot axis to either the spreading position or a non-spreading position.

7. The combine harvester according to claim 6, wherein the residue management system further comprises a mechanical linkage connecting the chaff spreader and the straw chopper, wherein movement of the straw chopper from the operating position to the non-operating position is translated into pivoting of the chaff spreader from the spreading position to the non-spreading position.

8. The combine harvester according to claim 1, wherein the chaff spreader comprises at least one fan module comprising a rotating impeller within a housing, the housing having an inlet for receiving chaff ejected by a cleaning shoe, and an outlet for ejecting the received chaff.

9. The combine harvester according to claim 1, wherein the straw chopper is mounted to a frame member of the combine harvester by a sliding mechanism configured to permit the straw chopper to move in a generally fore and aft direction along the sliding mechanism to either the operating position or non-operating position, the sliding mechanism comprising a pair of longitudinally extending, transversely spaced, rails upon which the straw chopper is slideably mounted.

10. The combine harvester according to claim 9, wherein the chaff spreader is slideably mounted to the straw chopper by a pair of longitudinally extending, transversely spaced, telescopic members, and wherein the chaff spreader is slideably moveable by said telescopic members to fore and aft positions with respect to the straw chopper.

11. The combine harvester according to claim 10, wherein, in one configuration, the straw chopper is disposed behind the straw ejection zone in the non-operation position, and the chaff spreader is disposed in front of the straw ejection zone in the spreading position.

12. A combine harvester comprising:
a residue management system having a straw chopper mounted to a frame in the vicinity of a straw ejection zone, said straw chopper mounted to the frame by a sliding mechanism comprising a pair of longitudinally extending, transversely spaced, rails; and
a chaff spreader pivotally mounted to the straw chopper proximate to a cleaning shoe ejection zone, the chaff spreader being pivotable about a transverse pivot axis to either a spreading position or a non-spreading position, the straw chopper comprising an inlet, and said straw chopper being slideably moveable along the sliding mechanism with respect to the frame to either an operating position in which straw falls into the inlet from the straw ejection zone, or a non-operating position in which straw ejected from the straw ejection zone bypasses the inlet; and a mechanical linkage connecting the chaff spreader and straw chopper, wherein movement of the straw chopper from the operating position to the non-operating position is translated into pivoting of the chaff spreader from the spreading position to the non-spreading position.

\* \* \* \* \*